US006560620B1

(12) United States Patent
Ching

(10) Patent No.: US 6,560,620 B1
(45) Date of Patent: May 6, 2003

(54) HIERARCHICAL DOCUMENT COMPARISON SYSTEM AND METHOD

(75) Inventor: Philip Waisin Ching, Gaitherburg, MD (US)

(73) Assignee: Aplix Research, Inc., Gaithersburg, MD (US)

( * ) Notice: Subject to any disclaimer, the term of this patent is extended or adjusted under 35 U.S.C. 154(b) by 0 days.

(21) Appl. No.: 09/366,367

(22) Filed: Aug. 3, 1999

(51) Int. Cl.[7] .............................................. G06F 17/27
(52) U.S. Cl. ........................ 707/511; 707/203; 707/514
(58) Field of Search ................................ 707/203, 511, 707/514, 526, 907

(56) References Cited

U.S. PATENT DOCUMENTS

| 4,827,330 | A | | 5/1989 | Walsh et al. | |
|---|---|---|---|---|---|
| 5,142,619 | A | | 8/1992 | Webster, III | |
| RE35,861 | E | * | 7/1998 | Queen | 345/781 |
| 5,819,300 | A | * | 10/1998 | Kohno et al. | 707/511 |
| 5,956,726 | A | * | 9/1999 | Aoyama et al. | 707/102 |
| 6,064,968 | A | * | 5/2000 | Schanz | 705/1 |
| 6,366,933 | B1 | * | 4/2002 | Ball et al. | 707/511 |

OTHER PUBLICATIONS

Wang et al., "Structural Matching and Discovery in Document Databases", Proceedings of the 1997 ACM SIGMOD Internation conference on Management of Data, Arizona, US, 1997, pp. 560–563.*

Douglis et al., "Tracking and Viewing Changes on the Web", USENIX Techincal Conference, 1996, pp. 1–13.*

Chawathe et al., "Change Detection in Hierarchically Structured Information", Proceedings of the 1996 ACM SIGMOD International conference on Management of Data, Quebec Canada, 1996.*

MacKenzie et al., "Comparing and Merging Files, diff, diff3, sdiff, cmp, and patch", GNU Manual, Sep. 1993, pp. 1–57.*

* cited by examiner

Primary Examiner—Jean R. Homere
Assistant Examiner—Khanh Pham
(74) Attorney, Agent, or Firm—Knobbe, Martens, Olson & Bear LLP

(57) ABSTRACT

A hierarchical document comparison system comprises a document server computer remotely accessible by a user computer. The document server computer includes a database which stores the contents of a first document and a second document. The first document contains one or more segments and the second document contains one or more segments. Each segment is identified by a segment identifier. The document server computer also includes a module executable in the document server computer. The module is configured to receive a request to compare the first document and the second document. The module compares the first document and the second document and identifies the segments in the documents containing differences. The module then displays on the user computer a side-by-side display listing the segment identifiers for the identified segments. The segment identifiers for the identified segments in the first document containing differences are displayed in a first list and the segment identifiers for the identified segments in the second document containing differences are displayed in a second list.

22 Claims, 9 Drawing Sheets

```
/DOD/DOC1/OLD/4.1.2                    /DOD/DOC1/NEW/4.1.2
AFTER COMPARISON                       AFTER COMPARISON 4.1.2 TANK OPERATIONS                  4.1.2 TANK OPERATIONS

WHEN THE PROVISIONS OF THE             WHEN THE PROVISIONS OF THE
PREVIOUS SECTION APPLY, THE TANKS      PREVIOUS SECTION APPLY, THE TANKS
ARE TO BE MAINTAINED IN COMPLIANCE     ARE TO BE MAINTAINED IN COMPLIANCE
WITH THE FOLLOWING:                    WITH THE FOLLOWING:

a) THE SPECIFICATION OF HOW THE        a) THE SPECIFICATION OF HOW THE
COMPONENTS OF THE GUNS ARE TO          COMPONENTS OF THE GUNS ARE TO
BE USED, AS INCLUDED IN 4.1.3;         BE USED, AS INCLUDED IN 4.1.3;

b) THE SPECIFICATION OF HOW THE GEARS  b) MTHE SPECIFICATION OF HOW THE GEARS
ARE TO BE OILED, AS INCLUDED IN        ARE TO BE OILED, AS INCLUDED IN
4.1.4; AND                             4.1.5; AND
```

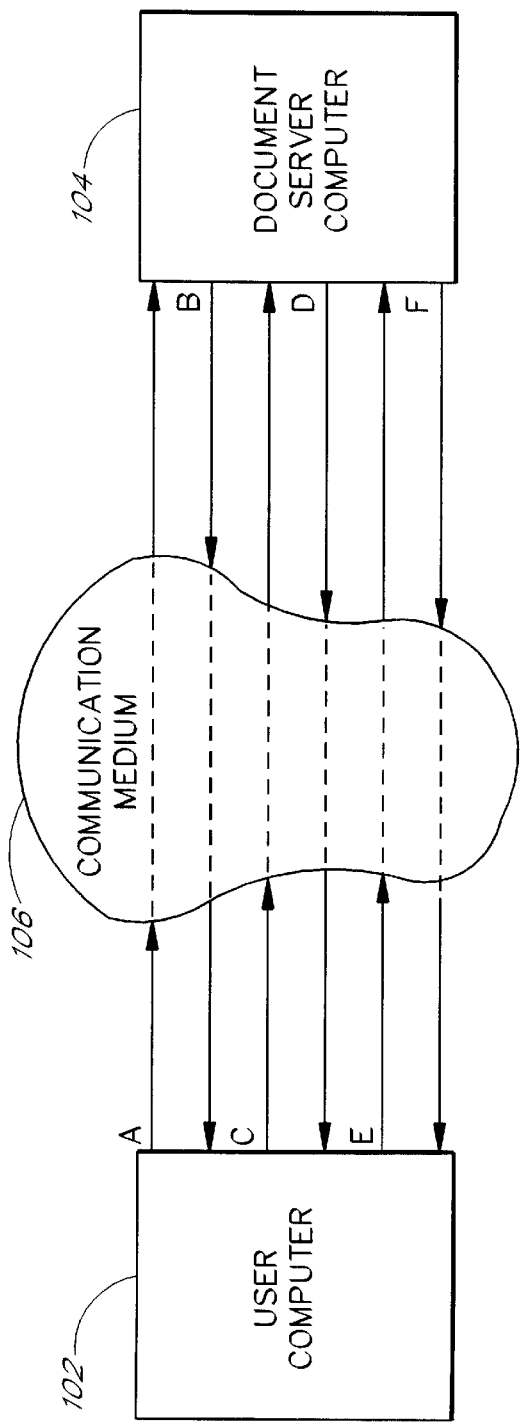

A. USER SUBMITS INFORMATION INCLUDING CATEGORY OF DOCUMENT TO COMPARE AND PASSWORD

B. DOCUMENT SERVER PRESENTS SIDE-BY-SIDE DISPLAY OF A LIST OF DOCUMENTS IN THE SPECIFIED CATEGORY OF DOCUMENT

C. USER SUBMITS A DOCUMENT FROM THE OLD DOCUMENT LIST AND A DOCUMENT FROM THE NEW DOCUMENT LIST TO COMPARE

D. DOCUMENT SERVER PRESENTS SIDE-BY-SIDE DISPLAY OF IDENTIFIERS WHICH IDENTIFY THE SEGMENTS OF THE SELECTED OLD AND NEW CONTAINING DIFFERENCES

E. USER SUBMITS A SEGMENT FROM THE OLD DOCUMENT AND A SEGMENT FROM THE NEW DOCUMENT TO COMPARE

F. DOCUMENT SERVER PRESENTS SIDE-BY-SIDE DISPLAY OF CONTENTS OF SELECTED SEGMENTS

FIG. 3

SELECT APPROPRIATE FILES TO COMPARE OR DISPLAY

| OLD DOCUMENT SOURCE | NEW DOCUMENT SOURCE |
|---|---|
| /DOD/DOC1/OLD | /DOD/DOC1/NEW |
| /DOD/DOC2/OLD | /DOD/DOC2/NEW |
| ... | ... |
| /DOD/DOCX/OLD | /DOD/DOCX/NEW |

[SUBMIT TO COMPARE]  [CLEAR THE SELECTION]

*FIG. 6*

SELECT APPROPRIATE FILES TO COMPARE OR DISPLAY

| OLD DOCUMENT SOURCE | NEW DOCUMENT SOURCE |
|---|---|
| /DOD/DOC1/OLD/3.1.1 | /DOD/DOC1/NEW/3.1.1 |
| /DOD/DOC1/OLD/3.1.2.5 | /DOD/DOC1/NEW/3.1.2.5 |
| /DOD/DOC1/OLD/4.1.2 | /DOD/DOC1/NEW/4.1.2 |

SUBMIT TO COMPARE

CLEAR THE SELECTION

FIG. 7

/DOD/DOC1/OLD/4.1.2
AFTER COMPARISON 4.1.2 TANK OPERATIONS

WHEN THE PROVISIONS OF THE PREVIOUS SECTION APPLY, THE TANKS ARE TO BE MAINTAINED IN COMPLIANCE WITH THE FOLLOWING:

a) THE SPECIFICATION OF HOW THE COMPONENTS OF THE GUNS ARE TO BE USED, AS INCLUDED IN 4.1.3;

b) THE SPECIFICATION OF HOW THE GEARS ARE TO BE OILED, AS INCLUDED IN 4.1.4; AND

/DOD/DOC1/NEW/4.1.2
AFTER COMPARISON 4.1.2 TANK OPERATIONS

WHEN THE PROVISIONS OF THE PREVIOUS SECTION APPLY, THE TANKS ARE TO BE MAINTAINED IN COMPLIANCE WITH THE FOLLOWING:

a) THE SPECIFICATION OF HOW THE COMPONENTS OF THE GUNS ARE TO BE USED, AS INCLUDED IN 4.1.3;

b) MTHE SPECIFICATION OF HOW THE GEARS ARE TO BE OILED, AS INCLUDED IN 4.1.5; AND

FIG. 8

HIERARCHICAL DOCUMENT COMPARISON SYSTEM AND METHOD

BACKGROUND

1. Field

The present invention relates generally to the field of document comparison. More particularly, the invention relates to a system and method for the storage, retrieval, and comparison of documents.

2. Description of the Related Art

The advent of text processing application programs have enabled the computer to become a viable tool for document creation. A user is able to develop a document by entering the text comprising the document into the computer using such an application program. Typically, the document contents are stored on the computer in what is known as a file. The user is able to subsequently make modifications to the document by recalling the stored file and making the desired changes. The user can then save the subsequent version of the document containing the modifications as the same file or a different file. Saving the document containing the modifications as a different file enables the user to create multiple versions of the document.

In the course of creating a document, it may be necessary or desirable for the user to compare two versions of the document. One method of comparing the different versions was to create a printout of the files containing the appropriate versions of the document and visually comparing the two printed files word-by-word and noting the changes. This process was labor intensive and very time consuming, especially for large documents. The user still had to laboriously scroll through the two files and note the changes.

Commercially available word processing programs such as Word 97, from Microsoft Corporation, and WordPerfect version 8.0, from WordPerfect Corporation, include a document compare feature that enables the comparison of a document currently displayed on the screen with a document stored on the disk as a file. The text which exist in the document stored on the disk but not in the currently displayed document is copied and inserted into the appropriate position in the currently displayed document and indicated by strikeout codes such as a "redline" through the text. The text which exists in the currently displayed document but not in the document stored on the disk is indicated accordingly, for example, by underlining the text. The user of these word processing programs still has to inspect the content of the entire document for the changes.

SUMMARY

The present invention hierarchically compares one or more documents stored on a computer. The hierarchical comparison allows a user to efficiently identify and view only those segments within the documents that are different.

In one preferred embodiment, a document server computer stores one or more documents in a document database. Additionally, the documents may advantageously be grouped into one or more document types or categories of documents. A category of document may advantageously be a logical grouping of types of documents including one or more versions of individual documents. The document server computer includes one or more web pages which are accessible by one or more users over a communication medium. The web pages enable a user to remotely request a comparison between two documents. The documents stored in the document database include one or more segments. A document segment is an identifiable portion of a document. For example, a segment may be a chapter, section, subsection, page, and the like. In one embodiment, the document database stores the document separated into its document segments.

A user utilizes a web browser executing on his or her user computer to connect to the document server computer. Once connected, the user can access the web pages and request a comparison between two documents. In one embodiment, the document server computer requests that the user specify a category of document to compare. The document server computer may also request a user password to ensure that the user has authorization to access the requested category of document. Having verified the password, the document server computer lists the documents contained in the requested category of documents.

In one embodiment, the most recent prior version of each of the documents may advantageously be listed in one list and the current version of the documents may advantageously be presented in another list. The user can then select a first document from one list and another document from the other list and request the document server computer to compare the selected documents. Substantially similar or like segments in the selected documents are compared, and segments containing differences or changes are identified. Upon detecting the first difference or change, the comparison is stopped for that segment, and the comparison proceeds to another segment. If a particular segment in one document does not have a substantially similar or like segment in the other document, the particular segment is identified as containing differences or changes. The segments identified as containing modifications or changes are listed in a side-by-side display on the user computer. One side of the display advantageously lists the identified segments from the first document and the other side of the display advantageously lists the identified segments from the second document. Ordinarily, the selected documents would be the current version and the immediately prior version of the same document. However, the user may select any document from the first list to be compared with any selected document from the second list.

The user can then select a first segment from one list and a second segment from the other list and request the document server computer to compare the selected segments. The document server computer compares the selected segments identifying the differences or changes between the two segments. Differences or changes between the selected segments may advantageously be identified at two levels. Components in the segment containing the differences or changes are appropriately indicated as well as the actual elements or subcomponents which are different. For example, a word contained in a sentence may be different between the selected segments. The document server computer can then identify the word as a unit or subcomponent containing differences or changes, and accordingly identify the sentence containing the changed word as the component containing differences or changes. The document server computer then displays the entire contents of each of the selected segments in a side-by-side display on the user computer. The identified components and subcomponents are distinguished in the side-by-side display of selected segment contents so that the user can quickly identify the changes that have been made to the segment contents.

The document server computer advantageously performs a document comparison in manageable hierarchies or stages. In one embodiment, a request to compare a category of document presents a list of documents in the requested category of documents. A subsequent document comparison presents a list of segments in the document that contain differences or changes. A further segment comparison presents the contents of the segment with the actual differences or changes, and the neighborhood of the actual differences or changes, appropriately indicated for clarity and identification.

Then, for example, a user can easily and efficiently observe changes made to a set of proposed government regulations including thousands of pages of regulations and comments, or an agreement containing a large volume of exhibits with specifications without having to view and scroll through the entire document. The proposed regulation or the agreement may contain one or more volumes and each volume may additionally contain thousands of sections and thousands of pages. Changes to the proposed regulations or agreements are made to a copy, or another version, stored on the document server computer. The regulations and agreements may be subject to review by one or more authorized users, and the users can efficiently and conveniently identify and observe the changes made to the regulations and agreements. The regulation or the agreement may be compared in hierarchies. At each hierarchical level, each segment of the document (which has been split up in accordance with natural divisions in the document, such as sections) that has been changed is identified and presented to the user. From this list of segments which contain content changes, the user can easily and conveniently focus in on a particular portion of the regulation or agreement that has been changed. The specified portion of the regulation or agreement of interest is further compared. Ultimately, the contents of the portion of the regulation or agreement of interest are fully displayed to the user. The actual changes, as well as the neighborhood of the changes, are further distinguished in this display for ease of identification.

BRIEF DESCRIPTION OF THE DRAWINGS

These and other aspects, advantages, and novel features of the invention will become apparent upon reading the following detailed description and upon reference to the accompanying drawings in which:

FIG. 3 is a block diagram illustrating one embodiment of a flow of information between a user computer and a document server computer through a communication medium;

FIG. 6 is a representation of one embodiment of an HTML page illustrating a side-by-side display of a list of documents;

FIG. 7 is a representation of one embodiment of an HTML page illustrating a side-by-side display of a list of segments of two documents containing differences;

FIG. 8 is a representation of one embodiment of an HTML page illustrating a side-by-side display of the contents of two segments-of two documents.

DETAILED DESCRIPTION

A document server facilitates a hierarchical, side-by-side comparison of documents over a communication medium. A first document is compared to a second document in hierarchies, and the result of the hierarchical comparison is presented in a side-by-side display. As an example, the complete document may advantageously be considered the top hierarchy. A segment of the document, such as a section or subsection within the document, can then be considered the next hierarchy. A component of the document segment, such as a paragraph or a sentence, can be considered the next lower hierarchy. Finally, subcomponents of the components, such as a word or a character, may advantageously be considered the lowest hierarchy. Differences at each hierarchy are identified and presented in a side-by-side manner.

In one embodiment of the invention, the document server includes a document database which stores the documents in electronic form. Typically, multiple versions of the documents are stored in the document database, and a user compares different versions of a document. The document server further comprises a web server and an interface module which enables access to the electronic contents stored in the document database. The web server provides connectivity to a communication medium such as the Internet and the World Wide Web (WWW). The document server includes a plurality of HTML page definitions (hereinafter referred to as HTML pages or web pages) accessible over the communication medium through the web browser.

A user utilizes a browser executing on a user computer to access the HTML pages on the document server. Using the HTML pages, the user submits identifying information to gain access to the documents stored in the document database. The user may then select a particular document or documents and request the document server to perform certain operations such as, by way of example, comparing the selected documents, displaying the selected document, and spell checking the selected document. Furthermore, because the document server is remotely accessible over the communication medium, multiple users located at differing geographical locations can access the document server and concurrently perform operations on the same document or documents.

Even though the invention is suitable for hierarchically comparing any number of documents or other electronic content stored on the document server at one time, the invention will be further disclosed in the context of hierarchically comparing two versions of a document and presenting the results in a side-by-side display. Throughout the drawings, components which correspond to components shown in previous figures are indicated using the same reference numbers.

Figure 1:
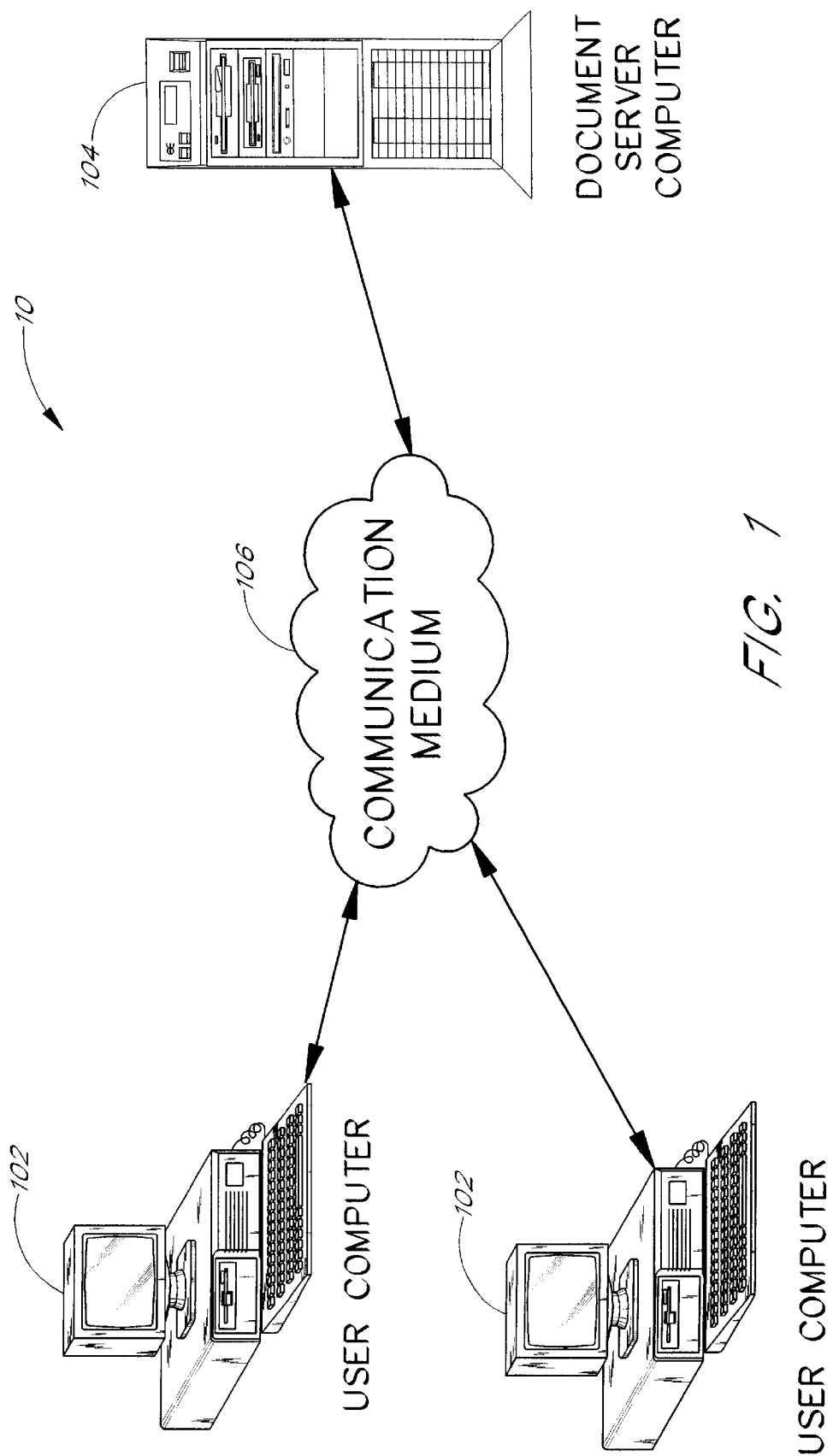
FIG. 1 is a system block diagram illustrating an embodiment of the overall network architecture.

One network architecture suitable for use with one preferred embodiment of the invention is indicated generally by a system 10 in FIG. 1. The system 10 includes a plurality of user computers 102 and a document server computer 104 which communicate with each other by use of a communication medium 106. Alternatively, the system 10 may include one or more document server computers 104.

A computer, including the computers 102 and 104, may be any microprocessor or processor (hereinafter referred to as processor) controlled device that permits access to the communication medium 106, including terminal devices, such as personal computers, workstations, servers, mini computers, main-frame computers, laptop computers, a network of individual computers, mobile computers, palm top computers, hand held computers, set top box for a TV, an interactive television, an interactive kiosk, a personal digital assistant, an interactive wireless communications device, or a combination thereof. The computers may further possess input devices such as a keyboard or a mouse, and output devices such as a computer screen or a speaker. Furthermore, the computers may serve as clients, servers, or a combination thereof.

These computers may be uniprocessor or multiprocessor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one preferred embodiment, the computers are equipped with a network communication device such a network interface card, a modem, or other network connection device suitable for connecting to the communication medium 106. Furthermore, the computers execute an appropriate operating system such as Unix, Microsoft® Windows® 3.1, Microsoft® Windows® 95, Microsoft® Windows® NT, Apple® MacOS®, or IBM® OS/2®. As is conventional, the appropriate operating system includes a communications protocol implementation which handles all incoming and outgoing message traffic passed over the communication medium 106. In other embodiments, while the operating system may differ depending on the type of computer, the operating system will continue to provide the appropriate communications protocols necessary to establish communication links with the communication medium 106.

The computers may advantageously contain program logic, or other substrate configuration representing data and instructions, which cause the computer to operate in a specific and predefined manner as described herein. In one embodiment, the program logic may advantageously be implemented as one or more modules. The modules may advantageously be configured to reside on the addressable storage medium and configured to execute on one or more processors. The modules include, but are not limited to, software or hardware components which perform certain tasks. Thus, a module may include, by way of example, components, such as, software components, object-oriented software components, class components and task components, processes methods, functions, attributes, procedures, subroutines, segments of program code, drivers, firmware, microcode, circuitry, data, databases, data structures, tables, arrays, and variables.

The communication medium 106 may advantageously facilitate the transfer of electronic content. In one embodiment, the communication medium 106 includes the Internet. The Internet is a global network connecting millions of computers. The structure of the Internet, which is well known to those of ordinary skill in the art, is a global network of computer networks utilizing a simple, standard common addressing system and communications protocol called Transmission Control Protocol/Internet Protocol (TCP/IP). The connection between different networks are called "gateways", and the gateways serve to transfer electronic data worldwide.

In one embodiment, the Internet includes a Domain Name Service (DNS). As is well known in the art, the Internet is based on Internet Protocol (IP) addresses. The DNS translates alphabetic domain names into IP addresses, and vice versa. The DNS is comprised of multiple DNS servers situated on multiple networks. In translating a particular domain name into an IP address, multiple DNS servers may be accessed until the domain name translation is accomplished.

One part of the Internet is the World Wide Web (WWW). The WWW is generally used to refer to both (1) a distributed collection of interlinked, user-viewable hypertext documents (commonly referred to as "web documents" or "web pages" or "electronic pages" or "home pages") that are accessible via the Internet, and (2) the client and server software components which provide user access to such documents using standardized Internet protocols. The web documents are encoded using Hypertext Markup Language (HTML) and the primary standard protocol for allowing applications to locate and acquire web documents is the Hypertext Transfer Protocol (HTTP). However, the term WWW is intended to encompass future markup languages and transport protocols which may be used in place of, or in addition to, HTML and HTTP.

The WWW contains different computers which store electronic pages, such as HTML documents, capable of displaying graphical and textual information. The document server computer 104 which provides information, for example, the electronic content to be hierarchically compared, on the WWW is generally referred to as a "website." A website is defined by an Internet address, and the Internet address has an associated electronic page. Generally, an electronic page may advantageously be a document which organizes the presentation of text, graphical images, audio and video.

One of ordinary skill in the art will recognize that the communication medium 106 may advantageously be comprised of other types of networks without detracting from the scope of the invention. The communication medium 106 can include, by way of example, local area networks (LANs), wide area networks (WANs), public internets, private intranets, a private computer network, a secure internet, a private network, a public network, a value-added network, interactive television networks, wireless data transmission networks, two-way cable networks, interactive kiosk networks, and the like.

In addition to the Internet, the communication medium 110 may advantageously include network service providers that offer electronic services such as, by way of example, Internet Service Providers (hereinafter referred to as ISP). An ISP or other network service provider may advantageously support both dial-up and direct connection in providing access to various types of networks. An ISP can be a computer system which provides access to the Internet. Generally, the ISP is operated by an ISP company. Examples of ISP companies include America On-line, the Microsoft Network, Network Intensive, and the like. Typically for a fee, these ISP companies provide a user a software package, username, password, and access phone number. Using this information, the user can then use the user computer 102 to connect to the ISP and access the Internet. Those of ordinary skill in the art will realize that the ISP is optional and a computer can advantageously execute software programs providing direct access to the Internet. In this instance, the computer may be connected directly to the Internet.

In one embodiment, a user utilizes the user computer 102 and communicates with the document server computer 104 by accessing the communication medium 106. For example, the user invokes a browser which executes on the user computer 102. The browser is further discussed below. The browser, in turn, establishes a communication link to the Internet directly or through an ISP. Once connected to the communication medium 106, the user can direct the browser to access the information made available on the document server computer 104.

The document server computer 104 includes a plurality of web pages which facilitate the comparison of electronic contents stored on the document server computer 104. As an example, one or more versions of a document are stored electronically on the document server computer 104. The document comparison is performed between one or more versions of substantially similar or like documents. The electronic contents may be information such as, by way of example, text, graphics, video, audio, and other forms of information capable of being stored on a computer. In one embodiment, the documents may advantageously include text or graphical information. In another embodiment, the documents may advantageously be comprised of audio information or video information. In still another embodiment, the documents can include any combination of the aforementioned forms of electronic content.

While communicating with the document server computer 104, the user is presented with a web page (a window displayed on the user computer 102) from which the user can remotely request a comparison of a particular type of document or category of document stored on the document server computer 104. A type of document or category of document may advantageously be a logical subject matter grouping of documents including one or more versions of each document (each version of which will advantageously be stored as a document in the system). The document server computer 104 can store one or more categories of documents or types of documents. By way of example, a first version and a second version of the FAA documents as well as a first version and a second version of the Department of Interior (DOI) documents may be stored on the document server computer 104. The FAA documents may advantageously be one category of document and the DOI documents may advantageously be another category of document. Typically, a category of document, such as the FAA documents, can consist of hundreds of documents. These documents may include, for example, the following documents: "Standards and Recommended Practices" and "Digital Voice Recorder." Furthermore, each document may be very large, consisting of thousands of pages. The thousands of pages can additionally be grouped into hundreds or even thousands of segments which the document may naturally be divided into. For example, segments may advantageously be sections and subsections actually used and labeled in each document (hereinafter, segment, section, and subsection are used interchangeably).

A user such as an FAA agency official responsible for maintaining and tracking the changes from one version of the FAA documents to a subsequent version of the FAA documents may advantageously benefit by quickly and easily observing changes made between the differing versions of the documents. In another embodiment, a lobbyist could quickly implement or modify strategies by easily and efficiently tracking the changes made to the FAA documents without having to pour through the thousands of pages.

Having selected a category of document for comparison, for example, the FAA documents, the user, such as an FAA agency official, may be required to provide further identifying information, such as a password, to the document server computer 104. The document server computer 104 authenticates the user provided identifying information to ensure that the documents in the requested category of document is accessed only by authorized users. Having authenticated the user information, the document server computer 104 lists the documents contained in the requested category of document. Continuing the above FAA example, the documents contained in the FAA category of document, including the "Standards and Recommended Practices" document and the "Digital Voice Recorder" document, are presented to the FAA agency official in a selectable list. In one embodiment, the documents are presented in a side-by-side display. One display lists one version of the FAA documents and the other display lists another version of the FAA documents.

The user can then select and submit a document contained in the requested category of document for comparison by the document server computer 104. Continuing the FAA example, the FAA agency official can select the "Standards and Recommended Practices" document from the selectable list for comparison by the document server computer 104. In one embodiment, the "Standards and Recommended Practices" document may be a telecommunications specification for international aviation defining the standards for the Aeronautical Telecommunication Network ("ATN").

Having received a user selected document for comparison, the document server computer 104 compares differing versions of the segments contained in the requested document. By way of example, a document may contain the following sections:

Section A
  Section A.1
    [text]
  Section A.2
    [text]
Section B
  [text]
Section C
  [text]

For the above document, the identifiable portions or segments of the document may advantageously be the sections containing text. For example, the segments may advantageously be "Section A.1," "Section A.2," "Section B," and "Section C." Then in comparing the document, the segment "Section A.1" in a first version of the document is compared to a "Section A.1" in a second version of the document. Both the first and the second versions of the document are stored on the document server computer 104. When a first modification or change is detected in comparing a document segment, the segment is identified as containing a change, the comparison of that particular segment ceases, and the comparison of another segment of the document commences. Subsequently, the document server computer 104 presents a list of segments which contain differences or changes in a side-by-side display. For example, if "Section A.1" is identified as being changed between the compared versions, the side-by-side display advantageously lists "Section A.1" as being changed. In another embodiment, a segment may advantageously be delineated at the section level, for example, by the sections "Section A," "Section B," and "Section C" above, contained in a document. In still another embodiment, the segment may be any identifiable portion of the document such as a chapter or a page.

Continuing the FAA example, the FAA agency official may advantageously select and submit the "Standards and Recommended Practices" document for comparison by the document server computer 104. Subsequently, the document server computer 104 compares the current version with the most recent older version on a segment by segment basis. For example, the "Standards and Recommended Practices" document may include thousands of segments including two segments entitled "Routing of Messages" and "Security on the Internet." One version of each segment of the "Standards and Recommended Practices" document is compared with the next earlier version of the substantially similar or like segment. In the FAA example, one version of the "Routing of Messages" segment is compared to another version of the "Routing of Messages" segment. If there is a modification or change in the segment, the segment is identified as containing a difference between versions. Once all the segments in the "Standards and Recommended Practices" document have been compared, the identified segments are listed in a side-by-side display. For example, both the "Routing of Messages" segment and "Security on the Internet" segment may be listed in the side-by-side display as containing differences between version. One display lists one version of the identified segments and the other display lists the other version of the identified segments. If no change has been made within a segment, that segment is not listed.

Subsequently, the user may advantageously select and submit one segment from the first list and another segment from the second list in the side-by-side display for comparison by the document server computer 104. The document server computer 104 then advantageously compares the contents of the submitted segments and identify components, such as, by way of example, a paragraph or a sentence, within the segments that are different. The contents of the submitted segments are presented to the user in a side-by-side display. One display shows the contents of one segment and the other display shows the contents of the other segment. The identified components within the segment which contain differences are presented in a manner which distinguishes it from the rest of the contents of the displayed segment. For example, the components which remain the same between the submitted segments can be presented in one color, such as blue, while the components which are different between the submitted segments can be presented in a different color, such as red. In another embodiment, the contents of one submitted segment may be presented in a first color, such as green, while the contents of the other submitted segment may be presented in a second color, such as white, to further distinguish the contents of one segment from the contents of the other segment.

Within the identified components, the actual subcomponent, such as , by way of example, the word, letter, pixel, byte, or bit, which is different between the submitted segments may advantageously be further identified and distinguished in the display of the segment contents. The identified subcomponent can be further distinguished in the side-by-side display of segment contents by means such as underlining or bolding. For example, in one display, the sentence containing a word which is different can be displayed in red, and the actual word which is different can be further underlined. The subcomponent is the actual content of the segment which is different while the component is the "neighborhood" containing the subcomponent.

Continuing the FAA example, the FAA agency official may select and submit the "Routing of Messages" segment from both lists in the side-by-side display. Subsequently, the document server computer compares the first version of the "Routing of Messages" segment to the second version of the "Routing of Messages" segment. The components of the segments containing differences are identified. The subcomponents within the identified components which are actually different are also identified. The contents of the first version of the "Routing of Messages" segment is displayed in one side of the side-by-side display. The contents of the second version of the "Routing of Messages" segment is displayed in the other side of the side-by-side display. The sentences which have changed between the two versions may advantageously appear in a different color or font than the reset of the contents of the "Routing of Messages" segment. The actual words within the sentences which are different may advantageously be further underlined or bolded in the display.

In another embodiment, selecting a category of documents to compare results in the documents server computer 104 displaying documents in the selected category of documents which have changed between the prior and current versions of the document in a side-by-side display. For example, the document server computer 104 can compare the time stamps of the document, or the size of the document, as stored on the document server computer 104 to determine if a document has changed between versions. In this embodiment, the user is only presented with documents containing differences.

One benefit of the invention is that it permits users to compare very large documents in stages or hierarchies. At the initial or first hierarchy is the type of documents or category of documents. Each type of documents or category of documents is an element or node in the particular hierarchy. In the FAA example above, the FAA category of documents can advantageously be one node in the first hierarchy. Another node in the top hierarchy would be, for example, the DOI documents. The documents contained in the category of documents compose the next or second hierarchy. Each document is an element or node in this particular hierarchy. In the FAA example, each one of the hundreds of documents, including the "Standards and Recommended Practices" Document and the "Digital Voice Recorder" document, can advantageously be one node in the second hierarchy. The segments contained in a document compose the third hierarchy. In the FAA example, each one of the thousands of segments, including the "Routing of Messages" segment and the "Security on the Internet" segment, can advantageously be one node in the third hierarchy. The components which are different when comparing one or more submitted segments are elements contained in a fourth hierarchy. The subcomponents contained in the components are elements in a fifth hierarchy. For example, each sentence (component) identified as being different between two submitted segments can advantageously be considered one node in the fourth hierarchy. Furthermore, each word (subcomponent) identified as being different between the two submitted segments can advantageously be considered one node in the fifth hierarchy.

Thus, the invention advantageously compares documents, including very large documents, in a layered or hierarchical manner. In one embodiment, requesting a comparison of a particular category of documents (an element in the first hierarchy) results in a listing of the documents contained in the requested category of documents (the listing of elements in the second hierarchy). Requesting a comparison of a listed document (an element in the second hierarchy) results in a listing of the segments contained in the requested document (elements in the third hierarchy) containing differences. Requesting a comparison of one or more segments (one or more elements in the third hierarchy) results in the display of segment contents with the components (elements in the fourth hierarchy) and the subcomponents (elements in the fifth hierarchy) being further distinguished in the display for ease of identification. Those of ordinary skill in the art will realize that there may be additional hierarchies or fewer hierarchies without detracting from the hierarchical comparison element of the present invention.

Figure 2:
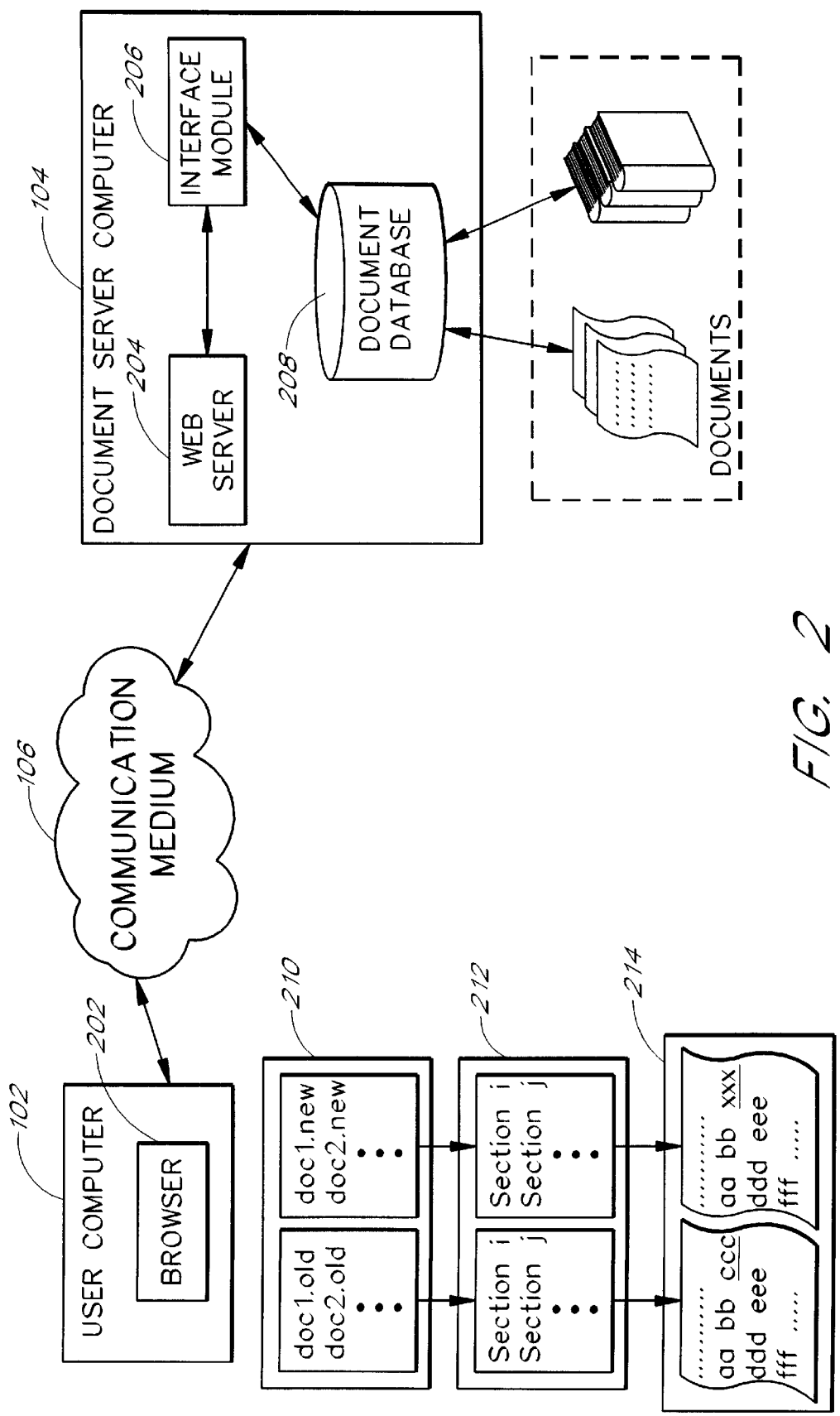
FIG. 2 is a high level block diagram illustrating one embodiment of the selected components of a user computer architecture and a document server computer architecture.

FIG. 2 illustrates in more detail selected components of the user computer 102 and the document server computer 104 of FIG. 1 suitable to implement one embodiment of the present invention. The user computer 102 includes a browser 202. The document server computer 104 includes a web server 204, an interface module 206, and a document database 208. The depicted components may advantageously communicate with each other and other components comprising the respective computers through mechanisms such as, by way of example, interprocess communication, remote procedure call, and other various program interfaces. Furthermore, the functionality provided for in the components, modules, and databases may be combined into fewer components, modules, or databases or further separated into additional components, modules, or databases. Additionally, the components, modules, and databases may advantageously be implemented on one or more computers.

The browser 202 is a software program which allows a user to access different computers, including the document server computer 104, through the communication medium 106. In one preferred embodiment, the browser 202 may be a standard browser such as the Netscape® Navigator developed by Netscape, Inc. or the Microsoft® Internet Explorer developed by Microsoft Corporation. One of ordinary skill in the art will realize that other types of access software could also be used to implement the browser 202. The other types of access software could be, by way of example, other types of Internet browsers, custom network browsers, two-way communications software, cable modem software, point-to-point software, custom emulation programs, and the like.

Figure 4:
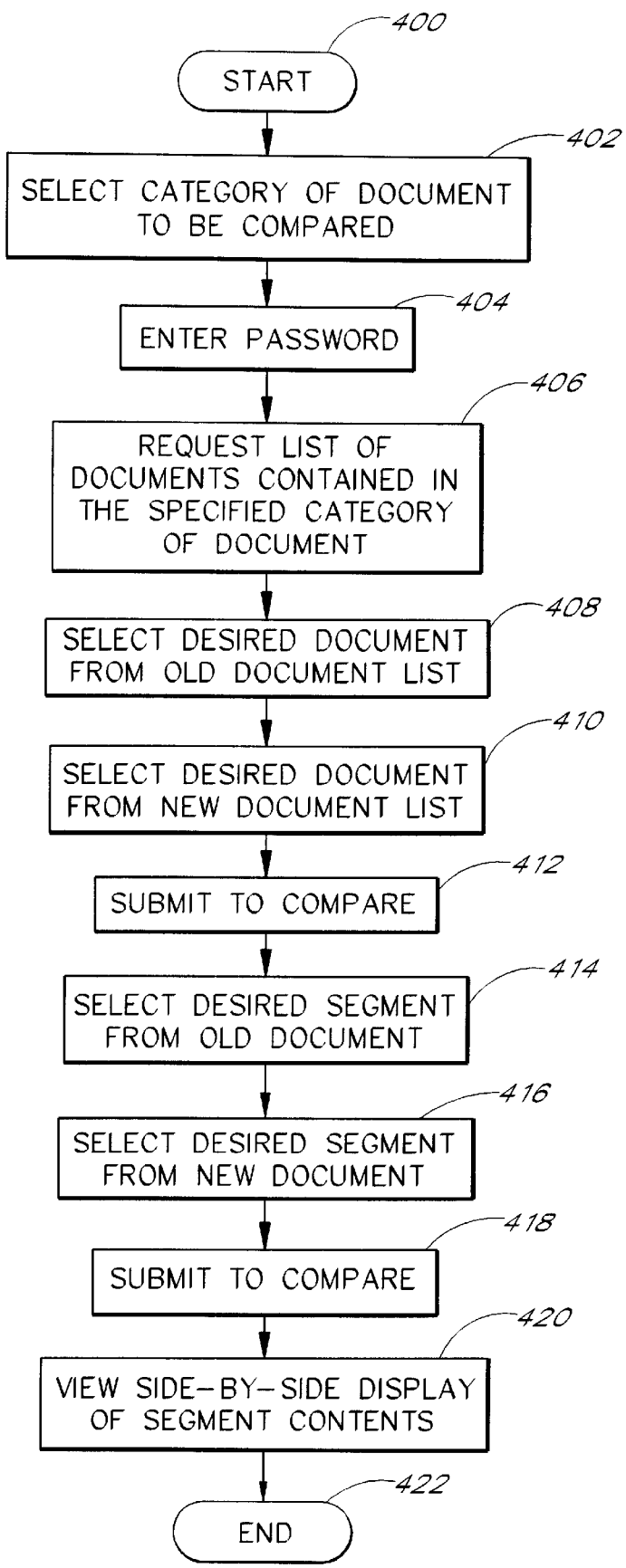
FIG. 4 is a flowchart illustrating a process by which a user requests the comparison of two documents in accordance with one embodiment of the present invention.

A user utilizes the browser 202 to access the document server computer 104, and more particularly, the web pages which facilitate the hierarchical side-by-side comparison of documents, and requests a document comparison be performed by the document server computer 104. One embodiment of a process by which a user requests a comparison of two documents is illustrated by the flow chart in FIG. 4. Beginning in a start state 400, the user initiates the execution of the browser 202 on his or her user computer 102. The user directs the user computer 102, utilizing the browser 202, to establish a communications link or network connection to the document server computer 104 through the communication medium 106. Having successfully established the network connection, the user is presented with a first web page stored on the document server computer 104 in state 402. In particular, the browser 202 displays the first web page which provides the user the capability to select a category of document to be compared by the document server computer 104. In one embodiment, a list of categories of documents stored on the document server computer 104 that can be compared may advantageously be presented to the user through a pull-down menu. From the list of the categories of documents, the user can use a pointing device, such as a mouse or the like, and select the desired category of document to compare. In another embodiment, the first web page may contain a data entry field conducive to accepting input from the user. The user may then use an input device, such as a keyboard, microphone, and the like, and specify the desired category of document.

Proceeding to state 404, the user provides a password, or other identifying information, to the document server computer 104. In one embodiment, the password is entered through the same web page through which the user specified the category of document. In another embodiment, the document server computer 104 may present the user a different web page which is to be used to provide the password. In still another embodiment, the user may not be required to provide a password to utilize the document comparison facility. In yet another embodiment, certain selected categories of documents, such as, by way of example, categories of documents containing confidential, classified, or sensitive documents, may require a password from the user. In state 406, the user requests a list of documents contained in the specified category of document. Again, this may be requested through either the same web page through which the user selected the category of document, the same web page through which the user provided the password, or through still another web page altogether. Those of ordinary skill in the art will realize that the particular ordering of the states 402, 404, and 406 is not critical, and that the aforementioned states may be rearranged in a different order, or even possibly omitted, without detracting from the scope of the invention.

Subsequently, the user is presented a web page containing a side-by-side list of documents 210 (see FIG. 2). The side-by-side list of documents identifies the documents contained in the specified category of document. In another embodiment, the side-by-side list of documents 210 identifies the documents which contain differences between one or old version of the document and another or new version of the same or like document. In still another embodiment, the user may be permitted to specify a threshold level of difference in order for a document to be included in the side-by-side list of documents 210. As an example, the user may be permitted to specify that documents containing an arbitrary number of different words, such as ten (10), between the old version and the new version are to be included in the side-by-side list of documents 210. In yet another embodiment, the threshold level of difference may advantageously be specified in units such as, by way of example, nibbles, bytes, pixels, and units of time such as seconds or minutes for electronic content such as video. One list identifies the old version of the documents (old document list). The other list identifies the new version of the documents (new document list).

Proceeding to state 408, the user selects a document from the old document list. The user may then advantageously select a document from the new document list in state 410. The user then submits the selected documents to the document server computer 104 for comparison in state 412. In one embodiment, the user may select any document from the old document list and any other document from the new document list. The document server computer 104 advantageously compares the submitted documents and appropriately identifies the segments contained within the submitted documents containing changes or differences. Typically, the user selects like documents, for example, an old version of a particular document from the old document list and the new version of the same document from the new document list, and submits the specified documents for comparison. Moreover, the user may advantageously select one document, either from the old document list or the new document list, and submit the selected document for comparison. In this case, the document server computer 104 need not compare the submitted document in order to identify the segments contained in the submitted document as being changed.

Subsequently, the user is presented a web page containing a side-by-side list of segments 212 (see FIG. 2). The side-by-side list of segments 212 identifies the segments contained within the specified documents which contain differences or changes. One list identifies the segments of the old version of the document containing changes (old section list). The other list identifies the segments of the new version of the document containing changes (new section list). As an example, a "section j" present in the specified document from the old document list and a comparable or like "section j" present in the specified document from the new document list may contain differences or changes. In this instance, the side-by-side list of segments 212 can specify "section j" in both the old section list and the new section list.

In one embodiment, if a segment in one document does not have a comparable segment in the other document, the segment that is present will be displayed in the appropriate segment list. For example, if the specified document from the old document list contains a "section k" which is not present in the specified document from the new document list, then "section k" appears as an entry in the old segment list and not the new segment list. Likewise, if the specified document from the new document list contains a "section m" which is not present in the specified document from the old document list, then "section m" appears as an entry in the new segment list and not the old segment list. Analogously, if the user submits one document for comparison, the segments contained in the specified document appear in the appropriate segment list as containing differences.

In one embodiment, the segment list may advantageously identify segments of the document containing differences or changes from like or comparable documents. The segments may advantageously be any identifiable portion of the document such as, by way of example, sections (including subsections, sub-subsections, etc.), chapters, pages, arbitrary number of paragraphs, sentences, words, nibbles, bytes or any other unit of storage, topics, acts, scenes, units of time, and the like.

Proceeding to state 414, the user selects a segment from the old segment list. The user may advantageously select a segment from the new segment list in state 416. The user then submits the selected segments to the document server computer 104 for comparison in state 418. In one embodiment, the user may select any segment from the old segment list and any segment from the new segment list. Advantageously, the user selects segments with the same segment identifier or segment label. The document server computer 104 advantageously compares the submitted segments and appropriately identifies the changes or differences.

Typically, the user selects like segments, for example, an old version of a particular segment from the old segment list and the new version of the same segment from the new segment list, and submits the specified segments for comparison. This may advantageously be implemented automatically such that, when the user selects a segment from either the old segment list or the new segment list, the corresponding segment in the other list is automatically selected. Alternatively, the user can select one segment from the old segment list and a different segment from the new segment list for comparison by the document server computer 104. This may be appropriate in an instance where the user knew of an insertion of a new document segment in the new version of the document. Insertion of this type may also be identified by a program, such as, by way of example, a compare program, executing on the document server computer, and indicated appropriately. The segments appearing after the newly inserted segment may have been according incremented in sequence. As an example, the old version of the document may include segments "Section A," "Section B," and "Section C." In the new version of the document, an entirely new segment, titled "Section A," may have been inserted before the existing "Section A" from the old version of the document. The "Section A" from the old version of the document may have been renamed "Section B" in the new version of the document. Likewise, the old "Section B" and "Section C" may have been respectively renamed "Section C" and "Section D" in the new version of the document. Then, the document server 104 will lists the segments in the old version of the document and the segments in the new version of the document as containing changes between the old and new versions of the document. In this instance, the user may benefit from requesting a comparison of "Section A" from the old section list and "Section B" from the new section list to determine the presence of substantive changes beyond the change in segment headings. Moreover, the user may advantageously select one segment, either from the old segment list or the new segment list, and submit the selected segment for comparison. In this case, the document server computer 104 need not compare the selected segment and the selected segment's contents are identified as being changed.

Proceeding to state 420, the user is presented a web page containing a side-by-side display of segment contents 214 (see FIG. 2). The side-by-side display of segment contents 214 displays the contents of the one or more segments previously submitted for comparison. The contents of the segment from the old segment list is displayed in one display while the contents of the segment from the new segment list is displayed in the other, second display. In the display, the components of the segment containing differences or changes between the submitted segments are appropriately identified. In the case of a textual document, the component may advantageously be a sentence or a paragraph. In the case of a graphical document, the component may be a number of pixels or lines of display. In the case of a video display, the component may be a number of frames. Those of ordinary skill in the art will realize that the selection of the component is arbitrary and may differ depending on the document type. The components may be appropriately distinguished in the display by displaying in a different color, font, type size, intensity, contrast, and the like. Within the components, the actual subcomponent, such as, by way of example, the word, letter, byte, bit, or pixel, which is different between the two displayed segments may be further distinguished. Having viewed the differences between the one or more submitted segments, the document comparison process proceeds to end state 422.

The web server 204 provides access to the communication medium 106 and delivers the plurality of web pages stored on the document server computer 104 to the one or more user computers 102. The plurality of web pages facilitate the comparison of documents stored in the document database 208. The web server 204 may be developed using standard web server software applications such as, by way of example, public domain software from NCSA and Apache, and commercial packages such as Netscape's Internet Server software, Microsoft's Internet Server software, and the like. These web pages are accessible by users executing a standard browser on the user computer 102. In another embodiment, the functionality providing access to, and delivery of, the plurality of web pages may be developed using a proprietary or non-standard software application. In this case, the user can execute a comparable software program, capable of interfacing to the proprietary or non-standard software executing on the document server computer 104, on the user computer 102 to access the web pages on the document server computer 104.

The interface module 206 performs the requested document comparison and facilitates communication between the web server 204 and the document database 208. For example, the document server computer 104, in processing a request to compare documents, receives the request through the web server 204. The web server 204 extracts the necessary information, and this information is advantageously processed by the interface module 206. As part of the processing, the interface module 206 accesses the documents and other data stored in the document database 208. Furthermore, the interface module 206 performs necessary operations, such as, by way of example, comparing the document contents and presenting some or all of the document contents to the user through the web server 204, on the document contents and other data retrieved from the document database 208 in the manner disclosed herein.

In one embodiment, the interface module 206 uses the Common Gateway Interface (CGI) protocol to process the information gathered from, and presented to, the user through the web server 204. The other operations, such as, by way of example, comparing the document contents and identifying the different or changed contents, performed by the interface module 206 as disclosed herein may advantageously be implemented using scripting languages, such as Unix shell (sh, ksh, or bash) and JavaScript, and other standard programming languages such as C and C++. Furthermore, the interface functionality enabling the interface module 206 to access the document database 208 may be implemented using the application language suited for the particular document database 208. Those of ordinary skill in the art will realize that the selection of the particular software language is arbitrary, and that, any software language capable of implementing the functions and features described herein may be used without detracting from the scope of the invention.

Figure 9:
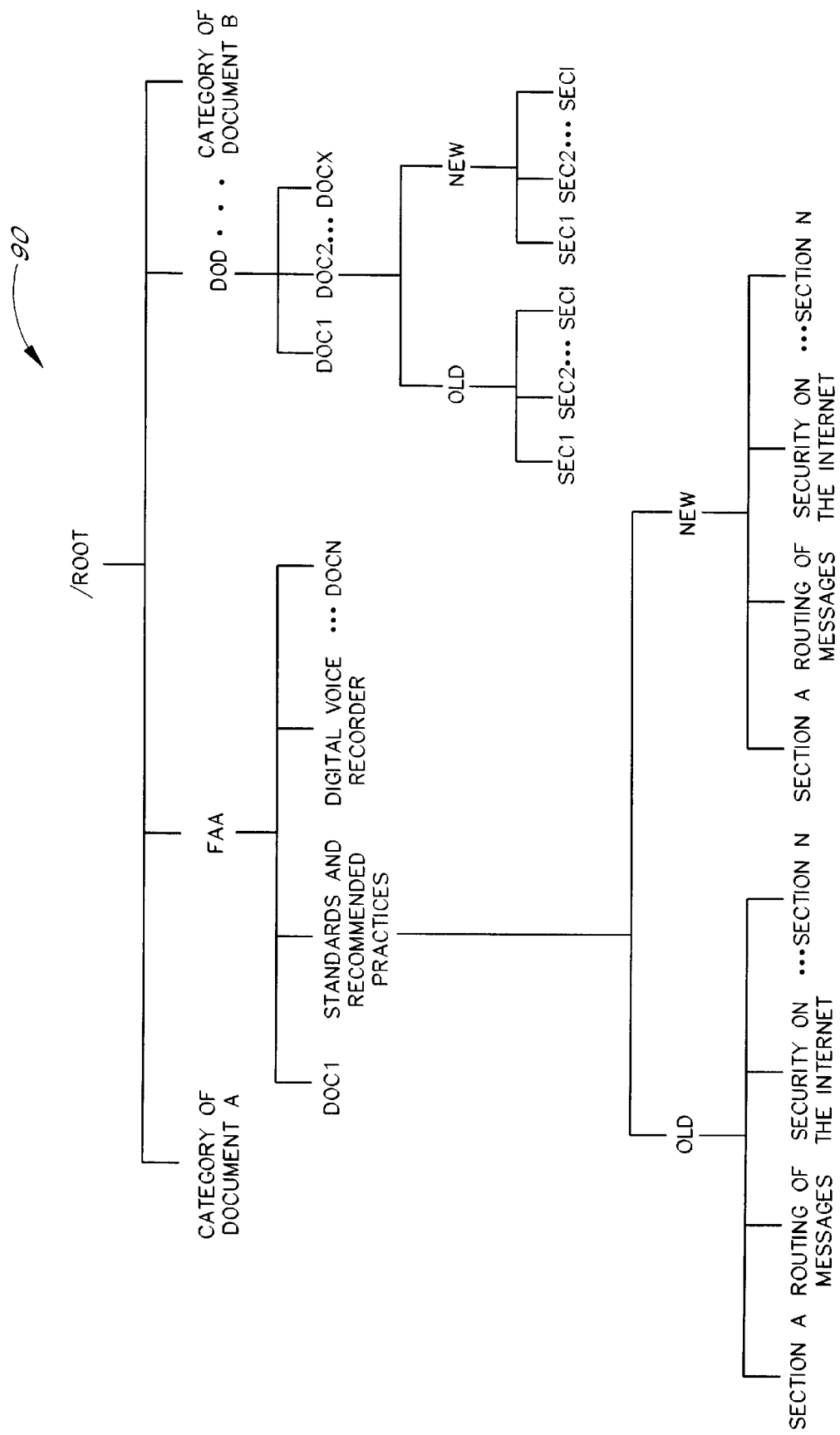
FIG. 9 is a representation of one embodiment of a document database of the invention.

The document database 208 is a repository for the documents stored on the document server computer 104. In one embodiment, the document database 208 utilizes a hierarchical file system, such as the Unix file system, in implementing the document repository. The structure of the hierarchical file system facilitates the storage of the electronic contents in one or more hierarchies or levels. As is generally illustrated by the document tree 90 in FIG. 9, at the top level is the root directory. Below the root directory is a directory containing the one or more categories of documents. Each category of document is an element or node in this level. Below each category of document may be one or more directories representing the documents contained within the particular category of documents. Each document is an element or node in this level. For example, as is illustrated in FIG. 9, the category of document "FAA" may be one node in the categories of documents level and may contain hundreds of documents titled "DOC1" through "DOCN" and including the "Standards and Recommended Practices" document and the "Digital Voice Recorder" document. As is also illustrated in FIG. 9, the category of document "DOD" may be another node in the category of documents level and may include the documents "DOC1" to "DOCX."

Below each document directory is an "OLD" directory and a "NEW" directory. The "OLD" directory contains the old version of the document and the "NEW" directory contains the new version of the particular document. Within the "OLD" and "NEW" directory are one or more files containing the contents of the respective document. In one embodiment, each file may advantageously correspond to a segment contained in a document.

Certain documents contain segment delimiters such as chapters, sections, and subsections. In one embodiment, the smallest unit, such as a section or subsection, containing text may be considered a segment and stored in a separate file. In another embodiment, a section may be considered a segment, and each section of the document, including all subsections contained within the section, may be stored in separate files. Other documents may not contain segment delimiters, but may be continuous in form. In this instance, the document server computer 104 may create artificial segments in the process of storing the document in the document database 208. For example, for a text document, twenty-six (or any other arbitrary number) lines of text may be considered a segment. For a video document, an arbitrary number of frames may be considered a segment. In still another embodiment, the document server computer 104 may advantageously contain program logic capable of parsing and the document contents and subsequently generating segments, and titles or segment headings for the created segments, based on the program's interpretation of the document contents. As an example, the program logic may advantageously parse the contents of a video document and create segments and segment headings based upon the program's perceived interpretation of the video document. Those of ordinary skill in the art will realize that the actual number files containing the document contents can vary based on the determination of what a segment is for a particular document during the storing of the document in the document database 208.

In another embodiment, more layers may be present in the directory tree 90. For example, the "Standards and Recommended Practices" document may be composed of five volumes, "VOL1" through "VOL5." In this instance, the node "Standards and Recommended Practices" may advantageously contain five directories or nodes representing the five volumes. Each volume or node can then contain the directories "OLD" and "NEW."

In still another embodiment, more directories may be present depending on the number of versions of the document that are stored on the document database 208. As an example, the document server computer 104 may advantageously store all the PTO documents as one of the category of documents in the document database 208. The "PTO" category of documents may consist of hundreds of documents. These documents may include, for example, the following documents: "Manual of Patent Examining Procedures" ("MPEP") and "Trademark Manual of Examining Procedures" ("TMEP"). Furthermore, each document may be very large, consisting of hundreds or thousands of pages. Additionally, the three most recent editions of the MPEP may be stored in the document database 208. The document server computer 104 may advantageously permit users, such as patent attorneys, to compare the three stored editions of the MPEP. The edition identifier, such as, by way of example, the edition number, the month and year designation, or a combination of both, may be used to distinguish the document versions. For example, the three editions of the documents may be appropriately identified by the text strings "/PTO/MPEP/FIFTHEDITION," "/PTO/MPEP/SIXTHEDITION," and "/PTO/MPEP/SEVENTHEDITION." Segments of each document may advantageously be the actual sections and subsections containing substantial data and appearing in the respective MPEP edition.

A patent attorney interested in quickly identifying the differences between the three editions of the MPEP may then use a user computer 102 and remotely access the document server computer 104. The patent attorney can then request to compare the "PTO" category of document. Upon receiving a listing of documents contained in the requested "PTO" category of document, the patent attorney may advantageously select the MPEP document for comparison by the document server computer 104. The document server computer 104 may advantageously list the segments contained in each of the three editions of the MPEP which contain differences in a side-by-side-by-side display. In one embodiment, if one segment in one edition of the MPEP is different from one other comparable segment in either of the other two editions of the MPEP, that segment identifier is listed in the side-by-side-by-side display. In another embodiment, a segment in one edition of the MPEP must be different from the other two comparable segments in the other two editions of the MPEP in order for the segment identifier to be listed in the side-by-side-by-side display. The patent attorney may then advantageously select one segment identifier from each of the three lists for comparison by the document server computer 104. The document server computer 104 may then compare the contents of the selected segments and display the segment contents in a side-by-side-by-side display appropriately distinguishing the changed segment contents.

In another alternative embodiment, the document server computer 104 may list the three editions of the MPEP in a web page and request the user to select two of the three editions of the MPEP for comparison. The patent attorney may then select two editions for comparison by the document server computer 104. Subsequently, the two specified editions of the MPEP can be compared by the document server computer 104. In still another alternative embodiment, the MPEP document may advantageously include both editions and revisions of the MPEP. In this instance, differing versions of the document may be identified by, for example, a combination of the edition number, the month and year designation, and the revision number. Those of ordinary skill in the art will realize that the version indicators, such as the "OLD" and "NEW" directories, may be located in another hierarchy or level in the document tree 90 without detracting from the scope of the invention.

A directory or file present in one directory does not necessarily have to be present in another directory. For example, a "SECTION B" may be present in the "OLD" directory for the "Standards and Recommended Practices" document but not present in the "NEW" directory for the particular document. In this instance, the "SECTION B" may have been deleted in going from the old version of the document to the new version of the document.

In another embodiment, document database 208 may be implemented with Structured Query Language (SQL) code. SQL is a relational database language standardized by the International Standards Organization (ISO). The document database 208 can be implemented utilizing any number of commercially available database products such as, by way of example, Microsoft® Access and the like. In still another embodiment, the document database 208 may conform to any database standard, or may even conform to a non-standard, private specification. The hierarchical structure of the document database 208 may be implemented using the selected database. In still another embodiment, the documents may be stored in the document database 208 in units of storage recognized by the particular database, and the contents of the units may be identified, retrieved, compared, modified, and listed in order to facilitate the hierarchical comparison of the electronic contents as disclosed herein.

Figure 5:
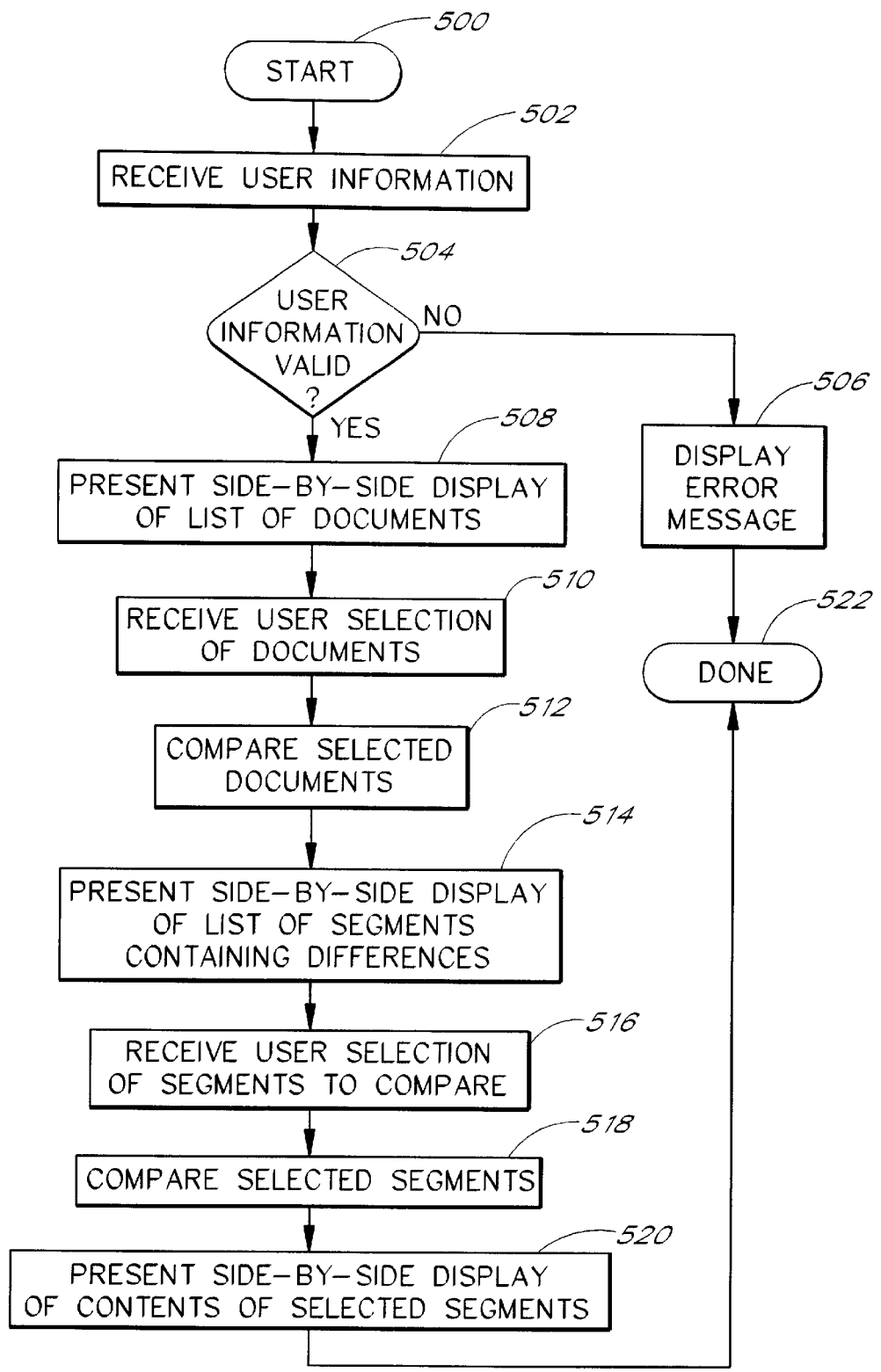
FIG. 5 is a flow chart illustrating a process by which two documents are compared in accordance with one embodiment of the present invention.

One embodiment of the interaction between the components of the document server computer 104, in particular the web server 204, the interface module 206, and the document database 208, in processing a document comparison request is generally illustrated in FIG. 5. Beginning in a start state 500, the document server computer 104 receives a user request to perform a document comparison. In particular the document server computer 104 receives the requested category of document to compare and the user's identifying information such as, by way of example, a password.

Proceeding to state 504, the user's identifying information is validated to ensure that the user is authorized to access the information contained in the specified category of document. In one embodiment, a data record may advantageously be used to maintain a list of users authorized to access the one or more categories of documents stored in the document server computer 104. The document server computer 104 can locate the data record for the particular category of document specified by the user and verify that the received user identifying information is found in the list of authorized users. By way of example, the user may specify "DOD" as the category of document and submit a password. Upon receipt of this request, the document server computer 104 can locate the "DOD" data record and determine if a password is required for access. If no password is required, then access is granted. If a password is required, then the "DOD" data record is searched to locate the submitted password. If the submitted password is not found in the "DOD" data record, an error message is displayed on the user computer 102 in state 506 and the document server computer 104 proceeds to end state 522.

Continuing the above DOD example, if the "DOD" category of document is not password protected, or the user submitted password is found in the "DOD" data record, the document server computer 104 lists the documents contained in the "DOD" category of document in a side-by-side display of list of documents in state 508. The old version of the documents contained in the requested category of documents may advantageously be listed in one side of the side-by-side display while the other side of the side-by-side display may advantageously list the new version of the documents contained in the specified category of documents. In another embodiment, a comparison is performed between the old version and new version of the documents contained in the specified category of document and the documents containing differences are displayed in the side-by-side display. With reference to the directory tree 90 (see FIG. 9), a check of the time stamp or the size of the directory for the directory nodes representing the documents can be performed to determine the documents which have changed between the old version and new version of the documents.

For the DOD example, with reference to the previously disclosed document tree 90 (see FIG. 9), each document in the "DOD" category of documents is listed in the side-by-side display. One embodiment of the side-by-side display of the list of documents is generally illustrated in FIG. 6. The old document versions may advantageously be presented in one list and the new document versions may advantageously be presented in another list. Furthermore, the document lists may be presented in a scrollable display. Continuing the DOD example, the side-by-side display can list the documents "DOD/DOC1/OLD" through "/DOD/DOCX/OLD" in the old list while listing the documents "DOD/DOC1/NEW" through "/DOD/DOCX/NEW" in the new list. From this screen, the user may advantageously use a pointing device, such as a mouse or the like, and select the documents "/DOD/DOC1/OLD" and "/DOD/DOC1/NEW" and subsequently submit the documents for further comparison.

Proceeding to state 510, the document server computer 104 receives the user submitted documents for further comparison. The submitted documents are compared in state 512. In one embodiment, each document segment in the old version is compared with the comparable or like segment in the new version. In the DOD example, the contents of "/DOD/DOC1/OLD/SEC1" is compared to the contents of "/DOD/DOC1/NEW/SECI." The identified segments are compared until a first difference is detected or until the segments compare successfully. If a difference is detected, the particular segments are identified accordingly as containing differences or changes, and the particular segments are no longer compared. In another embodiment, the time stamp, or the file size, of the files representing similar segments are compared in determining whether the segment has changed from one version to the other version. This comparison process continues until all document segments are compared.

In another embodiment, the segment comparison may be continued until a user specified threshold difference level is satisfied. As an example, the user may specify a threshold of 10 words which need to be different before a segment is identified as containing modifications or changes between the versions. If a particular segment contains differences satisfying the threshold level, the particular segment is identified as containing differences or changes. In still another embodiment, the user can specify a particular word or phrase as the threshold difference level. In this instance, segments containing an addition/deletion/change to the specified word or phrase between the old version and the new version may advantageously be identified as containing differences or changes. If either the old version or new version of a particular segment is nonexistent, then the existing segment is identified as containing differences or changes.

The document segments containing differences between the old document version and the new document version are presented to the user in a side-by-side display in state 514. One embodiment of the side-by-side display of the list of segments containing differences between differing versions of the segments within a document is generally illustrated in FIG. 7. The old version of the identified segments may advantageously be presented in one list and the new version of the identified segments may advantageously be presented in another list. The segment lists may be presented in a scrollable display. Continuing the DOD example, the comparison of the requested documents "/DOD/DOC1/OLD" and "/DOD/DOC1/NEW" may have identified the segments listed in the side-by-side segment list illustrated in FIG. 7 as containing differences between the old version and the new version. Utilizing this list, the user can quickly identify the document segments containing differences or changes between the two versions. From this screen, the user can identify and submit one or more segments to the document server computer 104 for further comparison. For example, the user can select and submit the segments "/DOD/DOC1/OLD/4.1.2" and "/DOD/DOC1/NEW/4.1.2" to the document server computer 104, whereupon the contents of the contents of the submitted segments are advantageously compared and displayed to the user. Note that the labels for the document segments could be any label useful to the user. Thus, for example, the text of the section heading could be included.

Proceeding to state 516, the document server computer 104 receives the user submitted segments for further comparison. The specified segments are retrieved from the document database 208 and compared in state 518. Segment components, such as, by way of example, sentences, paragraphs, images, photographs, and video frames, containing differences between the segments are identified. The subcomponents, such as, by way of example, words, letters, pixels, and frames, are further identified.

Proceeding to state 520, the document sever computer 104 displays the contents of the particular segments in a side-by-side display as generally illustrated in FIG. 8. Each display is clearly identified to indicate the segment being displayed. The contents of one requested segment are displayed on one side and the contents of the other requested segment are displayed on the other side. If only one segment was submitted for comparison in state 516, then only that segment's contents are displayed, and one of the displays may advantageously be empty. Furthermore, the displays may be scrollable to provide the user ease of navigation in viewing the displayed contents. In another embodiment, the contents of the particular segments may be displayed in one display or screen. In the display, the differences in the content may advantageously be indicated by methods such as, by way of example, underlining, "redlining," or differing colors.

In one embodiment, the previously identified segment components and subcomponents which have changed between the specified segments are distinguished from the other segment contents for clarity and ease of identification. For example, differing colors, shading, or dashed outlines, as indicated by hashes in FIG. 8, may be used to further distinguish the components containing differences from the rest of the segment contents. Lighter dashed lines or x-hatching, for example, would be suitable for image comparison to identify areas of change in the side-by-side images. The individual subcomponents which are different may advantageously be further distinguished by underlines. Continuing the DOD example, the contents of "/DOD/DOC1/OLD/4.1.2" are displayed on the left in the side-by-side display (see FIG. 8). The contents of "/DOD/DOC1/NEW/4.1.2" are displayed on the right in the side-by-side display. By way of example, "/DOD/DOC1/OLD/4.1.2" and "/DOD/DOC1/NEW/4.1.2" relate to tank operations. The component identified as containing differences between the submitted segments "DOD/DOC1/OLD/4.1.2" and "/DOD/DOC1/NEW/4.1.2," is the text which starts with "b)" and which is indicated by hashes in FIG. 8. The subcomponents of the segments that are different between the submitted segments "/DOD/DOC1/OLD/4.1.2" and "DOD/DOC1/NEW/4.1.2" are further indicated by underlines in FIG. 8. The underlines indicate that the subcomponent "THE" has been changed to "MTHE", and the subcomponent "4.1.4;" has been changed to "4.1.5;".

In another embodiment, the electronic contents stored in the document database 208 may include voice information. In comparing and presenting the differences between differing versions of the voice information, the document server computer 104 can transform the voice information into textual form and present the textual form of the voice information, with the appropriate differences indicated as disclosed herein, to the user in the side-by-side display. Furthermore, the voice information may advantageously be stored in the textual form in the document database 208. Thus, the voice information may advantageously be separated and stored in logical segments. In still another embodiment, the voice information may be stored in the document database 208 as sound signals, and these signals can subsequently be separated into logical segments, compared for differences between versions, and presented to the user through sound devices attached to the user computer 102.

In still another embodiment, the electronic contents stored in the document database 208 may include video information. The video information may be separated into logical segments such as, by way of example, different scenes, different topics, a predetermined length of time, or a predetermined number of frames. In comparing and presenting the differences between differing versions of the video information, the document server computer 104 can compare the appropriate segments of the video and determine the segments containing differences. The segments containing differences can be presented to the user in a side-by-side display as disclosed herein. The user can then select one or more video segments for further comparison by the document server computer 104. The document server computer 104 can identify components within the video segments containing differences between the submitted video segments. The submitted video segments can then be played in the side-by-side display with one video segment playing in one display and the other video segment playing on the other display. The video segments can be played simultaneously in the side-by-side display. Alternatively, the user may advantageously control the playing of the individual video segments. Furthermore, the when a component of the video segment containing differences is playing, an appropriate indicator, such as a light or banner message, may appear on the display alerting the user to the fact that the video segment being displayed on one or both of the side-by-side displays is a component of the video segment containing differences. A similar approach could be taken for segments of a recorded sound document such as music.

FIG. 3 illustrates one embodiment of the flow of information between a user computer 102 and the document server computer 104 when the user accesses the web pages stored on the document server computer 104 in requesting a document comparison. In event A, the user utilizes a browser 202 executing on his or her user computer 102 and accesses the document server computer 104 through the communication medium 106. In particular, through a web page stored on the document server computer 104, the user submits information including a category of document to compare and a user password. In event B, the document server computer 104 verifies the user submitted information and displays a list of documents contained in the user specified category of document. The documents may advantageously be displayed to the user in a side-by-side display through a web page displayed on the user computer 102. One side of the side-by-side display may advantageously list an old version of the documents (old document list) and the other side of the side-by-side display may advantageously list a new version of the documents (new document list). Through this web page, the user can select one or more documents for further comparison by the document server computer 104 in event C. For example, the user may select one document from the old document list and another document from the new document list. The selected documents can be alike or substantially similar. Alternatively, the selected documents can be distinct and different.

In event D, the document server computer 104 compares the user specified documents. In particular, the document comparison is performed by identifying segments within the documents, and comparing a segment in one document with a like or substantially similar segment in the other document. Segments containing differences or changes are appropriately identified and displayed to the user in a side-by-side display through a web page displayed on the user computer 102. The side-by-side display lists the segments identified as containing differences between the submitted documents.

For example, the identified segments from the document specified in the old document list may advantageously be listed in one of the side-by-side displays. The identified segments from the document specified in the new document list may advantageously be listed in the other of the side-by-side display.

Through this web page, the user advantageously selects one or more identified segments for further comparison by the document server computer 104 in event E. For example, the user may select a segment from the old version of the document and a substantially same or like segment from the new version of the document. In another embodiment, the user can select any one segment from one of the side-by-side displays and any other segment from the other side-by-side display. In this instance, the selected segments do not have to be substantially similar. In event F, the document server computer 104 compares the user submitted segments. The contents of the segments are compared and the differences or changes between the submitted segments are appropriately identified. Furthermore, the area or region of the segment containing the identified differences or changes are also identified. The document server computer 104 then displays the contents of the user selected segments in a side-by-side display through a web page displayed on the user computer 102. In the side-by-side display, the identified differences or changes within the segments, as well as the identified region or area of the segment containing the differences or changes, are displayed in a contrasting manner for easy identification by the user.

Subsequent to viewing the contents of the requested segments, the user can re-access the side-by-side list of segments containing differences and select one or more different segments from the side-by-side display for comparison by the document server computer 104. In one embodiment, the plurality of web pages facilitating the comparison of documents can be implemented with a "previous page" button well known to those of ordinary skill in the art. The user can use a pointing device, such as a mouse or the like, and click on the "previous page" button in the web page displaying the contents of the selected segments to access the side-by-side list of segments containing differences. The user may then advantageously select one or more segments for comparison by the document server computer 104. This process may be repeated until the user has selected and viewed the differences contained in the desired segments. Thus, the user may, but is not forced to, re-specify the category of document, or the documents of interest, after each comparison of the requested segment by the document server computer 104.

In another embodiment, the web pages facilitating the comparison of documents as disclosed herein may advantageously include a text entry area. The user may then specify one or more documents in the text entry area. Alternatively, the user may also specify one or more segments in the text entry area. The document server computer 104 may advantageously receive the one or more documents or the one or more sections entered by the user in the text entry area and subsequently perform the appropriate comparison. Thus, a more knowledgeable user may, but is not obliged to, make selections from the sequence of side-by-side displays in performing a document comparison. The more knowledgeable user may circumvent the sequence of making selections through the side-by-side displays by specifying the desired documents or segments for comparison through the text entry area.

The invention advantageously performs an efficient comparison of the differing versions of documents contained within a category of documents. The documents are compared in hierarchies or stages. In the first stage, the document contained in the requested category of documents is presented. Subsequently, if a particular document is selected for further comparison, the document segments are compared until a first difference is detected between the different versions of substantially similar or like segments. Each segment is compared until a first difference between versions is detected. If a difference is detected, the segment comparison ceases, and the segment is identified as containing differences or changes. The identified segments are subsequently presented to the user. Only when a particular segment is targeted for further comparison is the entire segment compared and identified differences accordingly displayed along with the rest of the segment contents in a manner as disclosed herein.

The invention affords the user an efficient comparison utility. In performing a comparison of a category of document, the user is presented differences in hierarchies or stages. The user is first presented with documents contained in the specified category of document. Upon designating a document for further comparison, the user is presented with segments within the document which contain differences. Upon selecting a segment for further comparison, the user is presented with the contents of the segment with the differences appropriately distinguished for ease of identification. Thus, the user is able to compare a category of documents in an efficient and hierarchical manner.

As an example, a very large agreement with substantial exhibits, such as a contract specifying the operational requirements for a newly proposed tank, can be stored on the document server computer 104. The agreement may contain thousands of pages and may additionally be comprised of a multiple number of volumes. Furthermore, each volume can contain thousands of sections. Authorized users may advantageously be permitted to make modifications to the stored agreement during, for example, the agreement negotiation process. In one embodiment, authorized users provide a password to the document server computer 104. If the password is authenticated, the user is permitted to make modifications and changes to the agreement stored on the document server computer 104.

The modifications can be made to a copy of the agreement. Thus, the agreement without the modifications or changes can be one version of the agreement and the agreement containing the modifications or changes can be another version of the agreement. During this negotiation process, the agreement can be subject to review by a multiple number of interested parties or users. One part of the review can include viewing and analyzing the changes proposed or made by one or more parties. For example, two or more users can simultaneously access the stored agreement versions and view and comment on one or more changes proposed to a particular section of the agreement. This invention allows multiple users to remotely access the stored agreement and quickly and efficiently identify and analyze the changes made by one or more parties to the agreement without having to view the contents of the entire agreement. Additionally, a user can quickly and easily identify changes to the agreement made by other authorized users.

For example, a user can request the document server computer 104 to perform a document comparison of the stored agreement versions. The stored agreement may advantageously be considered a category of document. The user can be presented with the one or more volumes contained in the agreement. The volumes may advantageously be considered the documents contained in the particular category of document. The document server computer 104 advantageously focuses the user to the volumes that actually contain differences or changes. In like fashion, the user can request a comparison of a specific volume and a specific segment contained in the specified volume. At each phase of the comparison, the user is presented with a segment listing identifying the segments of the volume containing changes. The user can then specify one or more segments for the document server computer 104 to compare. The contents of the requested segments are displayed and the segment contents which are different are further distinguished for identification. Consequently, the user does not have to browse the thousands of pages contained in the agreement to observe a particular change. Moreover, the user is able to focus the comparison to one of the multiple volumes, and one of the thousands of sections making up a volume, in observing and analyzing the particular change to the agreement. Those of ordinary skill in the art will realize that even though this invention is suited for comparing very large documents or agreements containing one or more volumes and thousands of sections, the invention may also be beneficially used to rapidly and hierarchically compare smaller documents and agreements.

This invention may be embodied in other specific forms without departing from the essential characteristics as described herein. The embodiments described above are to be considered in all respects as illustrative only and not restrictive in any manner. The scope of the invention is indicated by the following claims rather than the foregoing description.

What is claimed is:

1. A method of comparing at least two very large and very similar documents to quickly locate and identify differences in the documents, wherein the documents include a first document and a second document each having a large number of segments, each segment having a label and including a plurality of characters, said method comprising:

receiving a request to compare the first document and the second document;

performing a character-by-character comparison of at least some of the characters of the first document to at least some of the characters of the second document;

determining whether there are differences between the first document and the second document;

listing only the labels, and no other content, of only those segments that contain at least one difference in a first display in which the listed segment labels from the first document appear in a first display portion of said first display and the listed segment labels from the second document appear in a second display portion of said first display;

receiving a request to display at least one difference between (a) at least one segment of the first document having a segment label listed in said first display portion of said first display and (b) at least one corresponding segment of the second document having a segment label listed in said second display portion of said first display;

displaying the characters of the at least one segment of the first document and the characters of the at least one corresponding segment of the second document in a second display in which at least some of the characters of the at least one segment of the first document appear in a first display portion of said second display and at least some of the characters of the at least one corresponding segment of the second document appear in a second display portion of said second display; and distinguishing the characters which are different in said second display.

2. The method of claim 1, wherein at least one of said first display and said second display comprises a side-by-side display.

3. The method of claim 1, wherein one of the first document and the second document comprises a previous version of the other of the first document and the second document.

4. The method of claim 1, wherein at least one of the first document and the second document comprises contents selected from the group consisting of text, graphics, audio, video.

5. The method of claim 1, wherein distinguishing the characters which are different comprises a technique selected from the group consisting of underlining, bolding, redlining, shading, cross-hatching, use of a differing color, use of a contrasting font, use of dashed outlines.

6. The method of claim 1, wherein one of the at least one segment of the first document and the at least one corresponding segment of the second document comprises a previous version of the other of the at least one segment of the first document and the at least one corresponding segment of the second document.

7. The method of claim 1, wherein at least one of the first document and the second document is over one thousand pages in length.

8. The method of claim 1, wherein at least one of the segments comprises a unit selected from the group consisting of chapter, section, subsection, page, paragraph, sentence, line, minute, second, nibble, byte, topic, act, scene, frame.

9. A document comparison system designed to compare at least two very large and very similar documents to quickly locate and identify differences in the documents, wherein the documents include a first document and a second document each having a large number of segments, each segment having a label and including a plurality of characters, said document comparison system comprising:

a computer, said computer comprising a module executable in said computer wherein said module is configured to receive a request to compare the first document and the second document, said module performs a character-by-character comparison of at least some of the characters of the first document to at least some of the characters of the second document and determines whether there are differences between the first document and the second document, said module listing only the labels, and no other content, of only those segments that contain at least one difference in a first display in which the listed segment labels from the first document appear in a first display portion of said first display and the listed segment labels from the second document appear in a second display portion of said first display;

wherein said module is further configured to receive a request to display at least one difference between (a) at least one segment of the first document having a segment label listed in said first display portion of said first display and (b) at least one corresponding segment of the: second document having a segment label listed in said second display portion of said first display, said module displaying the characters of the at least one segment of the first document and the characters of the at least one corresponding segment of the second document in a second display in which at least some of the characters of the at least one segment of the first document appear in a first display portion of said second display and at least some of the characters of the at least one corresponding segment of the second document appear in a second display portion of said second display, wherein the characters which are different are distinguished in said second display.

10. The system of claim 9, wherein at least one of said first display and said second display comprises a side-by-side display.

11. The system of claim 9, wherein one of the first document and the second document comprises a previous version of the other of the first document and the second document.

12. The system of claim 9, wherein at least one of the first document and the second document comprises contents selected from the group consisting of text, graphics, audio, video.

13. The system of claim 9, wherein the characters which are different are distinguished by a technique selected from the group consisting of underlining, bolding, redlining, shading, cross-hatching, use of a differing color, use of a contrasting font, use of dashed outlines.

14. The system of claim 9, wherein one of the at least one segment of the first document and the at least one corresponding segment of the second document comprises a previous version of the other of the at least one segment of the first document and the at least one corresponding segment of the second document.

15. The system of claim 9, wherein at least one of the first document and the second document is over one thousand pages in length.

16. The system of claim 9, wherein said computer comprises a server accessible by a user utilizing a browser.

17. The system of claim 9, wherein said computer comprises a server remotely accessible by a user via a browser running on a user computer.

18. The system of claim 9, wherein at least one of the segments comprises a unit selected from the group consisting of chapter, section, subsection, page, paragraph, sentence, line, minute, second, nibble, byte, topic, act, scene, frame.

19. The method of claim 1, wherein each of said segment labels is unique within one of said first document and said second document.

20. The system of claim 9, wherein each of said segment labels is unique within one of said first document and said second document.

21. A method of comparing at least two very large and very similar documents to quickly locate and identify differences in the documents, wherein the documents include a first document and a second document each having a large number of segments, each segment having a label and including a plurality of characters, said method comprising:

receiving a request to compare the first document and the second document;

performing a character-by-character comparison of at least some of the characters of the first document to at least some of the characters of the second document;

determining whether there are differences between the first document and the second document;

listing only the labels, and no other content, of only those segments that contain at least one difference in a first display in which the listed segment labels from the first document appear in a first display portion of said first display and the listed segment labels from the second document appear in a second display portion of said first display;

receiving a request to display at least one difference between (a) at least one segment of the first document having a segment label listed in said first display portion of said first display and (b) at least one corresponding segment of the second document having a segment label listed in said second display portion of said first display;

displaying the characters of the at least one segment of the first document and the characters of the at least one corresponding segment of the second document in a second display in which at least some of the characters of the at least one segment of the first document appear in a first display portion of said second display and at least some of the characters of the at least one corresponding segment of the second document appear in a second display portion of said second display; and distinguishing the characters which are different in said second display;

wherein each of said segment labels is unique within one of said first document and said second document.

22. A document comparison system designed to compare at least two very large and very similar documents to quickly locate and identify differences in the documents, wherein the documents include a first document and a second document each having a large number of segments, each segment having a label and including a plurality of characters, said document comparison system comprising:

a computer, said computer comprising a module executable in said computer wherein said module is configured to receive a request to compare the first document and the second document, said module performs a character-by-character comparison of at least some of the characters of the first document to at least some of the characters of the second document and determines whether there are differences between the first document and the second document, said module listing only the labels, and no other content, of only those segments that contain at least one difference in a first display in which the listed segment labels from the first document appear in a first display portion of said first display and the listed segment labels from the second document appear in a second display portion of said first display;

wherein said module is further configured to receive a request to display at least one difference between (a) at least one segment of the first document having a segment label listed in said first display portion of said first display and (b) at least one corresponding segment of the second document having a segment label listed in said second display portion of said first display, said module displaying the characters of the at least one segment of the first document and the characters of the at least one corresponding segment of the second document in a second display in which at least some of the characters of the at least one segment of the first document appear in a first display portion of said second display and at least some of the characters of the at least one corresponding segment of the second document appear in a second display portion of said second display, wherein the characters which are different are distinguished in said second display;

wherein each of said segment labels is unique within one of said first document and said second document.

* * * * *

UNITED STATES PATENT AND TRADEMARK OFFICE
CERTIFICATE OF CORRECTION

PATENT NO. : 6,560,620 B1
DATED : May 6, 2003
INVENTOR(S) : Philip Waisin Ching

It is certified that error appears in the above-identified patent and that said Letters Patent is hereby corrected as shown below:

Column 25,
Line 63, please replace "the: second document" with -- the second document --

Signed and Sealed this

Fifteenth Day of June, 2004

JON W. DUDAS
*Acting Director of the United States Patent and Trademark Office*